Dec. 11, 1956     W. D. FLYNN, SR., ET AL     2,773,422
POLARIZING UNIVERSAL SUN GLASSES
Filed Nov. 25, 1953
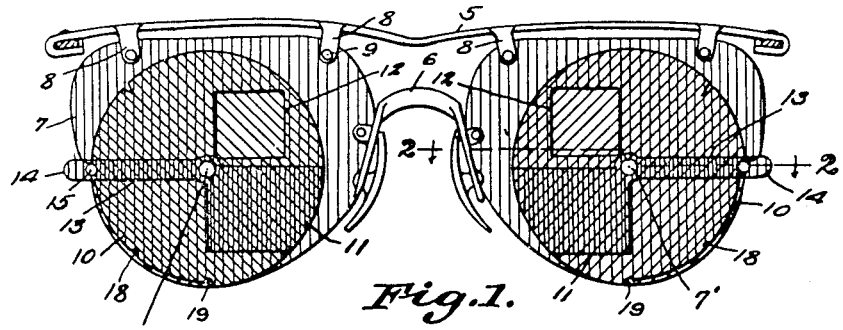
*Fig. 1.*
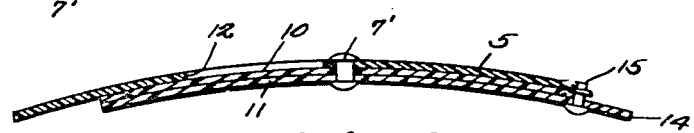
*Fig. 2.*
*Fig. 3.*
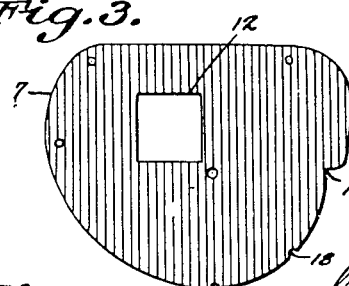
*Fig. 5.*
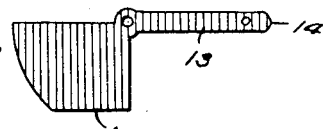
*Fig. 4.*
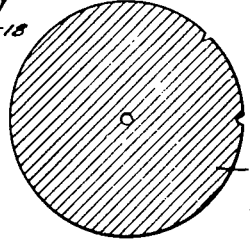
*Fig. 6.*
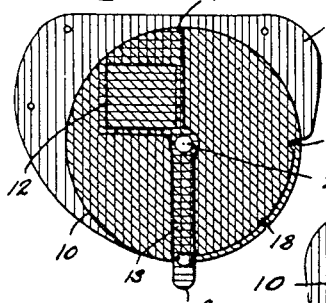
*Fig. 7.*
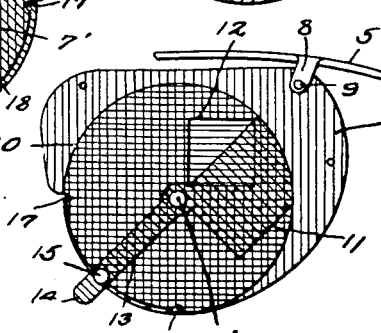
William D. Flynn Sr.
William D. Flynn Jr.
INVENTORS.
BY *C. A. Snow & Co.*
ATTORNEYS.

United States Patent Office 2,773,422
Patented Dec. 11, 1956

2,773,422

POLARIZING UNIVERSAL SUN GLASSES

William D. Flynn, Sr., Washington, D. C., and William D. Flynn, Jr., Morrow, Ga.

Application November 25, 1953, Serial No. 394,272

5 Claims. (Cl. 88—41)

This invention relates to eyeglasses, and particularly to eyeglasses known as sun glasses, commonly employed for reducing or eliminating glare caused by direct sunlight or from light beams projected from the headlights of approaching motor vehicles.

The primary object of the invention is to provide eyeglasses of this character embodying main stationary colored polarizing lens elements mounted in an eyeglass frame, the stationary lens elements having cut out portions in the direct line of vision of the person using the eyeglasses, and superposed polarizing clear lens elements rotatable over the stationary lens elements for regulating the passage of light through such glasses.

An important object of the invention is to provide sun glasses having a clear opening in the line of vision, through the glasses, to prevent dilation of the pupils of the eyes of the wearer, and at the same time effectively screen out objectionable glare.

A further object of the invention is to provide shutters with actuating arms for rotating the clear polarizing lens elements with respect to the stationary colored polarizing lens elements to regulate the passage of light through the lenses, the shutters moving over the apertures in the stationary lens elements to the end that the area of clear visibility through the apertures may be varied as desired to insure a clear view of the road surface ahead and to the right of the path of travel of the vehicle operated by a person wearing the polarizing sun glasses, the lenses screening out sunlight glare as well as glare from approaching vehicles.

Still another important object of the invention is to provide eyeglasses wherein the polarizing lenses thereof embody stationary color polarizing lens elements and superposed clear rotary polarizing lens elements which may be adjusted with respect to the stationary lens elements, adapting the eyeglasses for viewing three-dimensional motion pictures.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a rear elevational view of sun glasses, constructed in accordance with the present invention.

Fig. 2 is an enlarged sectional view taken on line 2—2 of Fig. 1.

Fig. 3 is a rear elevational view of one of the polarizing colored stationary lens elements.

Fig. 4 is a rear elevational view of a polarizing clear lens element which in operation is mounted on the colored stationary or fixed lens element for rotation thereon.

Fig. 5 is an elevational view of the shutter and actuating arm used in conjunction with the stationary and rotatable lens elements.

Fig. 6 is a rear elevational view wherein the rotatable clear lens element and the shutter have been moved to afford only slightly more than the minimum of reduction in the transmission of light, but providing the overall anti-glare protection of conventional sun glasses.

Fig. 7 is a rear elevational view of sun glasses wherein the rotatable clear polarizing lens element and shutter have been moved to provide a clear sight opening.

Referring to the drawing in detail, the reference character 5 indicates generally a frame for eyeglasses, which frame provides a support for the lenses forming the essence of the present invention.

The reference character 6 indicates the nose piece of the glasses, which nose piece is secured to the adjacent lenses of the sun glasses.

While the sun glasses forming the subject matter of the present invention, embody a pair of identical lenses, only one of these lenses will be described in detail.

Each lens embodies a stationary colored polarizing lens element 7 secured to the frame of the eyeglasses, by means of the ears 8 that extend over the edge of the stationary lens element, the ears being secured to the lens element 7 by means of rivets 9. Each lens also includes a superposed circular clear polarizing lens element 10 rotatably connected with the stationary colored polarizing lens element 7 by pivot 7' so that the clear polarizing lens element 10 may be rotated over an equal circular area of the stationary polarizing lens element 7, to regulate the passage of light through the parts of the lens which includes the rotatable lens element 10. Secured to each clear polarizing lens element 10, to move therewith, is a shutter 11 which is constructed of polarizing lens material colored to render the same translucent, the shutter being designed to move over the square opening 12 formed in the stationary lens element 7, associated therewith. As clearly shown by the drawing, the shutter is secured to the inner surface of the clear polarizing lens element 10 and is provided with an actuating arm 13 that is of a length to extend beyond the periphery of the lens element 10, providing a finger piece 14 whereby the circular clear polarizing lens element 10 and shutter 11 may be simultaneously moved to regulate the passage of light through that part of the lens which includes the said rotatable circular clear polarizing lens element 10.

Extending from the arm is a lug 15, which lug is adapted to move into the notches 17, 18 and 19 formed in the periphery of the stationary lens element 7, the notches being spaced predetermined distances apart, to provide gauge openings, in which the lug 15 moves, to control the size of the transparent opening through which the side of the road may be viewed, when using the sun glasses as a shield against glare from the headlights of motor vehicles during night driving.

It might be further stated that the notch 19 is arranged so that when the lug 15 moves thereinto, the shield will completely cover the square opening 12 providing sun glasses, for reducing or eliminating glare caused by direct sunlight or from light beams projected from the headlights of approaching motor vehicles.

By moving the actuating arms 13 of the shutters of the sun glasses to cause the shutters 11 to move to positions such as shown by Fig. 7 of the drawing, one-half of each square opening is shielded, leaving a portion of the areas of the square openings uncovered for a clear view of the edge of the road surface, while the major portions of the lens will then provide such near maximum reduction in the transmission of light as to shield the eyes of the person wearing the eyeglasses against glare from approaching headlights of automobiles during night driving, or against bright sunlight rays during daytime driving.

By moving the actuating arms 13 to positions where the lugs 15 will move into the notches 17, the shutters 11 will be moved to positions to uncover the entire areas of the openings 12 for clear vision through such openings.

When it is desired to adjust the lenses of the eyeglasses for viewing three-dimensional motion pictures, the shutters and movable lens elements are rotated so that the shutters are in the position as shown by Fig. 1 of the drawing which places the polarizing axes of the rotatable lens elements at ninety degree angles with respect to the polarizing axes of the stationary lens elements making it possible for the wearer to effectively view three-dimensional motion pictures.

From the foregoing it will be seen that due to the construction shown and described, we have provided what might be termed sun glasses for universal use, to provide glasses which may be used for reducing or eliminating glare caused by direct sunlight or from the lights of approaching motor vehicles, or which may be regulated to provide a clear section in the line of vision of the person wearing the eyeglasses with the remaining portion of the lenses shielding the eyes of the wearer against glare.

It will also be seen that should it be desired, the movable lens elements may be rotated with respect to the stationary lens elements so that the device may be used in viewing three-dimensional motion pictures.

Having thus described the invention, what is claimed is:

1. A sun glass comprising a frame, lens combinations supported by said frame, each lens combination embodying a stationary polarizing lens element and a superposed polarizing lens element rotatable on the stationary lens element regulating the passage of light through that part of the stationary lens element covered by one of said lens elements being colored, the other element being clear, said stationary lens element having a cut out portion in the line of vision through the lens, and a colored polarizing shutter secured to the rotatable lens element movable over said cut out portion, to cover a selected portion of said cut out portion.

2. Sun glasses comprising a frame, lens combinations supported by said frame, each lens combination embodying a stationary colored polarizing lens element and a superposed polarizing clear lens element mounted for rotation with respect to the stationary lens element on said stationary lens element, regulating the passage of light through that part of the stationary lens element covered by said rotatable lens element, said stationary lens element having a cut out portion in the line of vision through said lens, and a colored polarizing shutter secured to the rotatable lens element movable over said cut out portion, controlling vision through the cut out portion.

3. Sun glasses comprising a frame, lens combinations supported by said frame, each lens combination embodying a stationary colored polarizing lens element, a superposed clear polarizing lens element mounted for rotation on said stationary colored lens element regulating the passage of light through that part of the stationary lens element covered by said rotatable lens element, said stationary colored lens element having a cut out portion in the line of vision through the lens, a shutter secured on said rotatable clear lens element, said shutter being offset with respect to the axis of said rotatable lens element for movement over the cut out portion simultaneously with the rotation of said clear lens element, and means for temporarily holding the movable lens element in various positions of adjustment on said stationary lens element.

4. Sun glasses comprising a frame, lens combinations supported by said frame, each lens combination embodying a stationary colored polarizing lens element having a sight opening therein, a superposed clear polarizing lens element mounted for rotation on said stationary colored polarizing lens element, a colored polarizing shutter secured to said rotary clear lens element adapted to move over said sight opening regulating the area of clear vision through said opening, and an actuating arm connected with said shutter extended beyond the edge of the lens for effecting rotation of said clear lens element and shutter.

5. The subject matter as claimed in claim 1, and means for holding said rotatable lens element and shutter secured thereto, in various positions of adjustment on said stationary lens element.

References Cited in the file of this patent

UNITED STATES PATENTS

| 1,247,853 | McWenie | Nov. 27, 1917 |
| 1,495,828 | Weller | May 27, 1924 |
| 2,304,504 | Metzber et al. | Dec. 8, 1942 |